United States Patent [19]
van der Lely

[11] Patent Number: 5,842,436
[45] Date of Patent: Dec. 1, 1998

[54] CONSTRUCTION FOR AUTOMATICALLY MILKING ANIMALS, SUCH AS COWS

[76] Inventor: Cornelis van der Lely, 7 Brüschenrain, Ch-6300, Zug, Switzerland

[21] Appl. No.: 867,979

[22] Filed: Jun. 3, 1997

Related U.S. Application Data

[62] Division of Ser. No. 690,820, Aug. 1, 1996, Pat. No. 5,697,324, which is a division of Ser. No. 84,705, Jun. 25, 1993, Pat. No. 5,606,932.

[30] Foreign Application Priority Data

Jun. 25, 1992 [NL] Netherlands .............................. 9201127
Jun. 25, 1992 [NL] Netherlands .............................. 9201128

[51] Int. Cl.$^6$ ................................................ A01J 5/007
[52] U.S. Cl. ...................................................... 119/14.08
[58] Field of Search ............................ 119/14.01, 14.02, 119/14.03, 14.08, 14.14

[56] References Cited

U.S. PATENT DOCUMENTS

| | | | |
|---|---|---|---|
| 4,517,923 | 5/1985 | Palmer .................................. | 119/14.08 |
| 5,069,160 | 12/1991 | Street et al. ........................... | 119/14.08 |
| 5,606,932 | 3/1997 | Van Der Lely ....................... | 119/14.14 |
| 5,697,324 | 12/1997 | Van Der Lely ....................... | 119/14.08 |

*Primary Examiner*—Thomas Price
*Attorney, Agent, or Firm*—Penrose Lucas Albright

[57] ABSTRACT

An apparatus for automatically milking animals, such as cows, comprising a robotic mechanism, two computers each having a display screen and keyboard, the apparatus having a plurality of exchangeable parts provided with a signalling device to transmit information when an exchangeable part is malfunctioning, the signalling device also identifying the malfunctioning part on one of the display screens of a computer. An emergency electrical battery is provided at an individual compartment for milking an animal for providing electrical power in the event of failure of the main power, and a computer is provided for closing down non-vital functions in the event of such power failure or of malfunctioning of the part or parts concerned. The teat cups of the set of teat cups which are automatically installed and removed from the last animal being milked can also be individually installed manually on the animal's teats, and a second set of teat cups for similar manual installation and removal is also provided, including conduits for pulsating the teat cups of the second set connected to a vacuum source, and for conveying milk received in such teat cups to a receptacle.

16 Claims, 4 Drawing Sheets

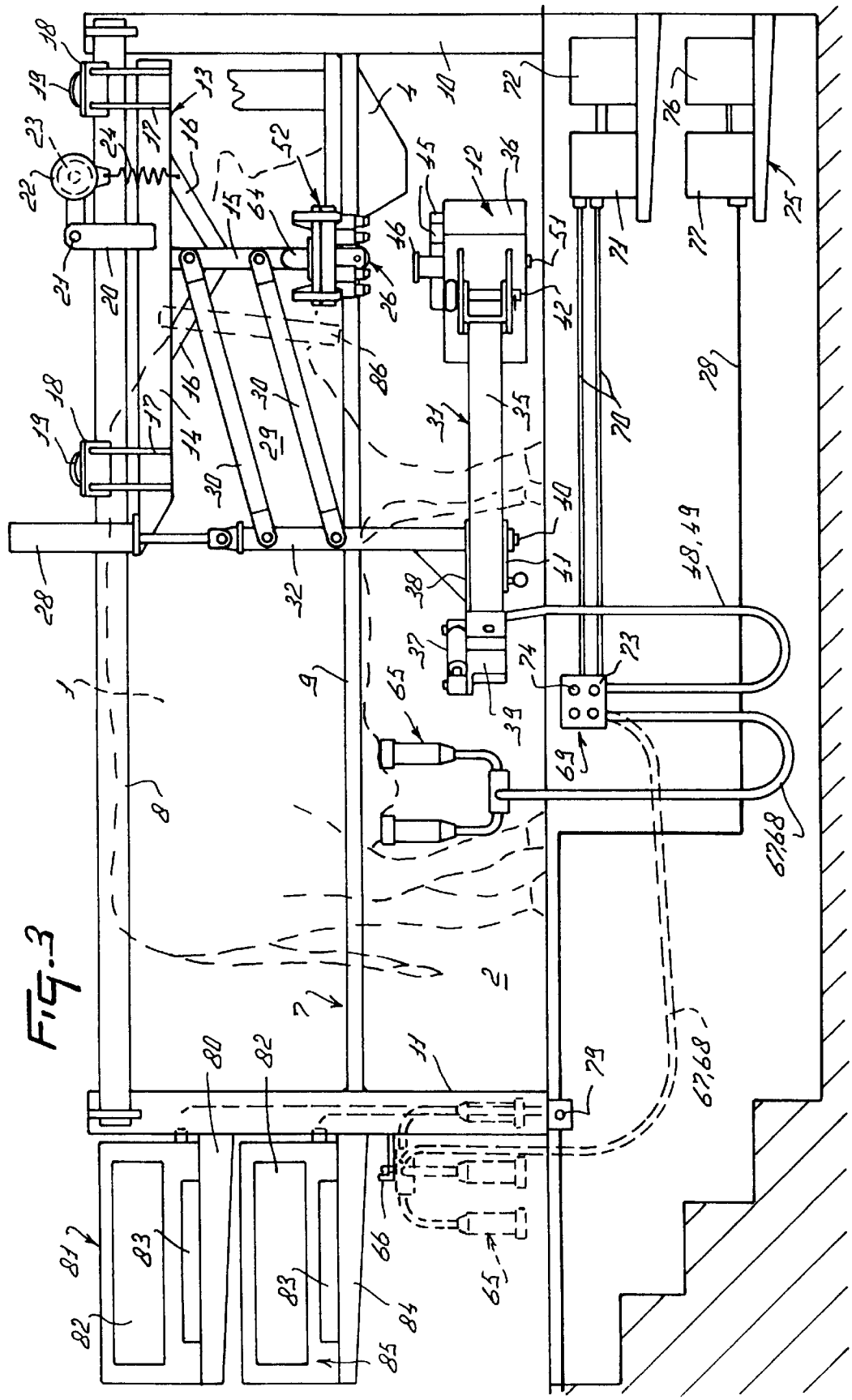

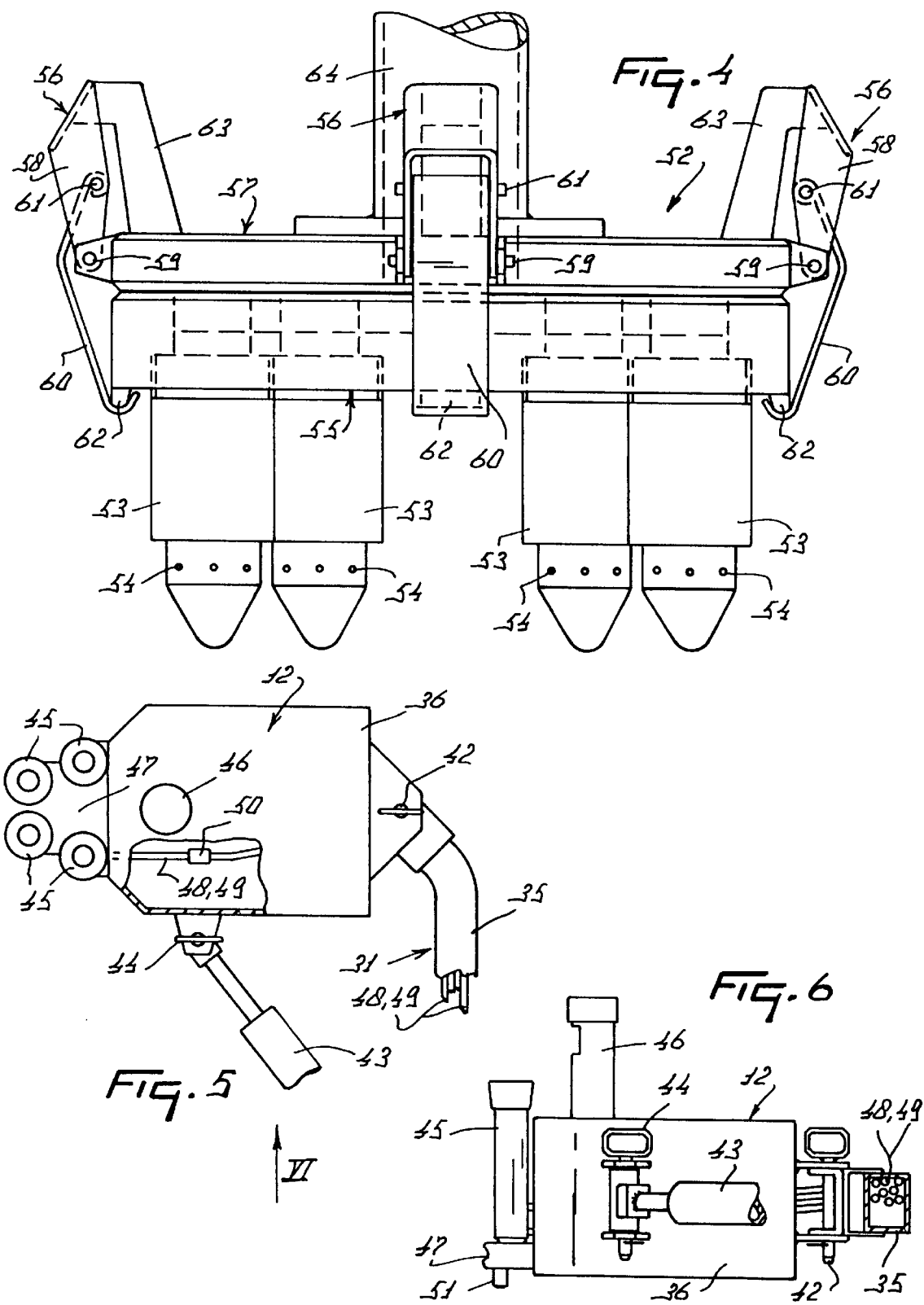

CONSTRUCTION FOR AUTOMATICALLY MILKING ANIMALS, SUCH AS COWS

This is a division of application Ser. No. 08/690,820, which was filed Aug. 1, 1996, now U.S. Pat. No. 5,697,324, which is a division of application Ser. No. 08/084,705 which was filed Jun. 25, 1993 and has an international filing date of Jun. 25, 1992 and issued as U.S. Pat. No. 5,606,932 Mar. 4, 1997.

FIELD OF INVENTION

The present invention relates to an implement for automatically milking animals, such as cows. The invention comprises a robot which includes a milking means, and a computer having a display screen.

BACKGROUND OF THE INVENTION

An implement for automatically milking animals, including a milking robot, must satisfy very stringent requirements, since the milking robot operates for the largest part of the time without human supervision. Especially during milking, the milking robot is particularly vulnerable. Since animals differ in size, in temperament and in intelligence, unpredictable reactions of the animals may occur. Thus, for example, it is possible for an animal to kick the milking robot or the milking cluster with its hind legs. This may damage the milking robot, thereby causing the robot to malfunction or to become completely inoperative. If the user does not notice such a malfunctioning milking robot for several hours or does not notice it at all, this may have serious consequences for the milking operation and for the health of the animals.

SUMMARY OF THE INVENTION

An object of the invention is to provide an implement wherein the aforesaid disadvantages do not occur or are at least obviated to a significant extent.

The implement according to the invention is characterized in that it includes a plurality of exchangeable parts provided with signalling means, wherein, when an exchangeable part is out of order, the screen display indicates which part is out of order.

Thus, the user is informed via the screen that a given part of the milking implement does not function properly. In addition, a disturbance which cannot be noticed with the eye becomes immediately visible to the user. Consequently, the user can act rapidly and accurately in an early stage of the disturbance.

In accordance with a feature of the invention, the signalling means are interfaced with the memory of the computer and signals are applied to the computer memory by the signalling means.

In accordance with a further feature of the invention, the exchangeable parts are incorporated in the implement with one or a plurality of quick-action connections. This makes it possible to replace a faulty part rapidly.

In accordance with a further feature of the invention, the signalling means of the exchangeable parts are provided with characters, such as letters or figures. The characters are also stored in the memory of the computer, and are also provided on the relevant exchangeable part of the construction. The characters are also shown in a diagram of the exchangeable parts. This makes it possible to isolate the faulty modular, exchangeable parts rapidly, which significantly reduces the repair time.

The invention, therefore, also relates to an implement for automatically milking animals, such as cows, which comprises a milking robot including milking means and a computer having a display screen. The implement includes a plurality of exchangeable parts with signalling means. The signalling means are provided with characters, such as letters or figures. The characters are also stored in the memory of the computer, and they are provided on the relevant exchangeable part of the implement. The characters are also shown in a diagram of the exchangeable parts.

In accordance with a further feature of the invention, the computer is interfaced with a telephone or a similar apparatus, so that with the aid of the computer a remotely located service department can be informed of any disturbance occurring in a given part of the implement. The computer can also indicate in which plant the disturbance occurred.

The invention, therefore, also relates to an implement for automatically milking animals, such as cows, which comprises a milking robot including milking means as well as a computer having a display screen, characterized in that the computer is interfaced with a telephone or a similar apparatus, wherein the computer can inform a remotely located service department that a disturbance has occurred in a given part of the implement, and also in which plant this disturbance occurred. This has the advantage that the service department is directly informed that a given part of a milking implement does not function properly. The service engineer can then request further data via a display screen and consult with the local operator whether and how the disturbance can be eliminated as rapidly as possible.

In accordance with a further feature of the invention, the implement includes software which indicates whether or not a malfunction as reported on the display screen is of a serious nature. The invention, therefore, also relates to an implement for automatically milking animals, such as cows, which comprises a milking robot including a milking means and a computer having a display screen, characterized in that the implement includes software which indicates whether a disturbance in the construction as reported on the display screen is serious or not so serious. Inasmuch as the seriousness of the disturbance can simultaneously be read from the display screen, the user can immediately decide whether immediate action is necessary.

In a preferred embodiment, the display screen or similar information display device for reporting the defects, the disturbances, or both, is located outside the farm building, (for example, in a house). The invention, therefore, also relates to an implement for automatically milking animals, such as cows, which comprises a milking robot including a milking means as well as a computer having a display screen, characterized in that the display screen or similar information display device for reporting the defects, the disturbances, or both, is located outside the farm buildings, (for example, in a house). Outside the normal working hours the milking implement can be checked for proper operation from the user's home.

In accordance with a still further feature of the invention, a signalling means are provided on separate, easily removable circuit boards and the signalling means apply a signal to the computer when the circuits malfunction, thereafter the display screen indicates which circuit has malfunctioned. The invention, therefore, also relates to an implement for automatically milking animals, such as cows, which comprises a milking robot including milking means as well as a computer with display screen, characterized in that the signalling means are provided on separate, easily removable circuit boards. The signalling means apply a signal to the computer when the circuits malfunction, so that the display screen indicates which circuit has broken down. The faulty circuit can then easily be removed from the mother board and be replaced by a new circuit. In accordance with a further feature of the invention, the exchangeable parts carry numbers, so that the parts can rapidly be located in the implement. Preferably, the parts of the milking robot may be provided with numbers in accordance with a list stated hereinbelow, which numbers are also stored in the computer memory.

A construction in accordance with the invention may include a list of the following numbers:

1) a railing around the cow
2) a frame which is movable in the longitudinal direction of the milking box
3) a part which moves in a horizontal plane
4) teat cups with a carrier member
5) tubes and holders for the teat cups
6) operating cylinders (pneumatic or hydraulic cylinders, or both
7) valve blocks
8) control cable and control tubes for electronics, pneumatics or hydraulics, or both
9) sensors
10) laser
11) teat cleaner
12) teat cup cleaner
13) mastitis sensor
14) milk meter
15) milk glass
16) computer for process control of robot with display screen
17) keyboard
18) circuits for different functions
19) transponder attached to the animal's collar
20) computer for data and for manipulating implement with a display screen
21) telephone
22) modem A construction as defined above for automatically milking animals, including a milking robot, must satisfy very stringent requirements. It is, for example, desirable that such a milking robot can be in continuous operation, preferably 24 hours a day, without failure and without human supervision. This may, however, sometimes lead to problems, as some animals can cause unexpected problems during milking. It is, for example, possible that an animal could make a kicking motion towards the milking robot. The legs of the animal may then damage the milking robot. The damage can be serious so that certain parts of the robot must be repaired or replaced. Before the milking robot is operational again, a considerable period of time may elapse. During this period no milk can be obtained. When the disturbance is of a long duration, the animal's health can be endangered.

To that end, the implement in accordance with the invention includes means to switch the automatically operating milking implement to manual operation. The invention, therefore, also relates to an implement for automatically milking animals, such as cows, which comprises a milking robot including milking means, characterized in that the implement includes at least one automatically operating milking implement, which is equipped with switching means to switch the automatically operating implement over to manual operation. An advantage thereof is that, if the disturbance cannot rapidly be eliminated, the user has the option to switch the automatically operating machine over to a manually operable milking machine. The milking operation can then continue until the malfunction has been repaired.

In a specific embodiment in accordance with the invention, the implement comprises a manually operable milking implement as well as an automatically operating one. The invention, therefore, also relates to an implement for automatically milking animals, such as cows, comprising a milking robot including milking means, characterized in that the construction comprises a manually operable milking implement as well as an automatically operating one. This has the advantage that, if the automatically operating milking implement is out of order, it can be switched off, and milking can be immediately continued with the manually operable milking implement.

To facilitate manual coupling of the teat cups, the implement in accordance with the invention includes a working pit next to the milking box of the milking implement. The invention, therefore, also relates to an implement for automatically milking animals, such as cows, comprising a milking robot including milking means, characterized in that the implement includes a working pit located next to the milking box.

In accordance with a further feature of the invention, the implement includes at least one emergency device which serves as an energy source when the implement cannot use the electricity from the main power supply. In the event of a power failure, the milk production is not endangered, as a manual or entirely automatic switch to the emergency device can be made.

In accordance with a feature of the invention, the emergency device comprises at least one battery for the supply of electricity. The invention, therefore, also relates to an implement for automatically milking animals, such as cows, comprising a milking robot including milking means, characterized in that the implement includes at least one battery for the power supply.

In accordance with a further feature of the invention, the implement includes means for making inoperative a number of components or tasks of the implement which are not vital to the milking procedure, such as, for example, the milk production inspection or the teat disinfecting apparatus. The invention, therefore, also relates to an implement for automatically milking animals, such as cows, which comprises a milking robot including milking means, characterized in that the implement includes means for making inoperative a number of components or tasks of the implement which are not vital to the milking procedure, such as, for example, the milk production inspection or the teat disinfecting implement. In the case in which, for example, a fault occurs in the milk production inspection, a signal is applied to the computer via, for example, an error reporting system, whereupon the computer interrupts the milking procedure and puts the milking robot out of operation. If the disturbance cannot be quickly repaired, the milk recovery is endangered at that moment. To prevent this, the user has the option to put the milk inspection out of operation, so that milking with the milking robot can be continued without the milk production being monitored. In an alternative embodiment, putting the non-vital components or tasks of the implement out of operation is automatically effected by the computer. Consequently, in such an embodiment, no human intervention is necessary.

In accordance with a further feature of the invention, the implement includes a carrier member on which teat cups are provided. In accordance with a still further feature of the invention, the carrier member is attached to a straight guide, which allows the teat cups to be moved near the leading side of the milking box. The invention, therefore, also relates to an implement for automatically milking animals, such as cows, which comprises a milking robot including milking means, which includes a carrier member which carries teat cups, as well as a milking box, characterized in that the carrier member which carries the teat cups is attached to a straight guide, which allows the teat cups to be moved near the leading side of the milking box. If a disturbance occurs in, for example, the carrier member carrying the teat cups, the carrier member with the teat cups can be moved in a straight line toward the leading side of the milking box, which results in more space for manual milking.

In accordance with a further feature of the invention, the implement includes a second set of teat cups with tubes. The second set of teat cups with tubes is couplable, in accordance with a still further feature of the invention, to a vacuum pump of the milking implement via a number of valves or cocks. If the automatic milking implement has broken down, it can be removed by sliding it along the straight guide and the second set of teat cups can be connected to the milking implement. The user can then continue milking manually until the automatic milking implement has been repaired.

For a better understanding of the invention and to show how the same may be carried into effect, reference will now be made, by way of example, to the accompanying drawings.

BRIEF DESCRIPTION OF THE DRAWINGS

FIG. 3 is a side elevation view of the implement shown in FIG. 2;

FIG. 4 is, to an enlarged scale, a view of a modular exchangeable part of the implement in accordance with FIGS. 1 to 3;

FIG. 5 is, to an enlarged scale, a plan view in partial section of a further modular exchangeable part of the implement of FIGS. 1 to 3, and FIG. 6 is a side elevation view in partial section taken in the direction of the arrow VI in FIG. 5.

DESCRIPTION OF THE PREFERRED EMBODIMENTS

Figure 1:
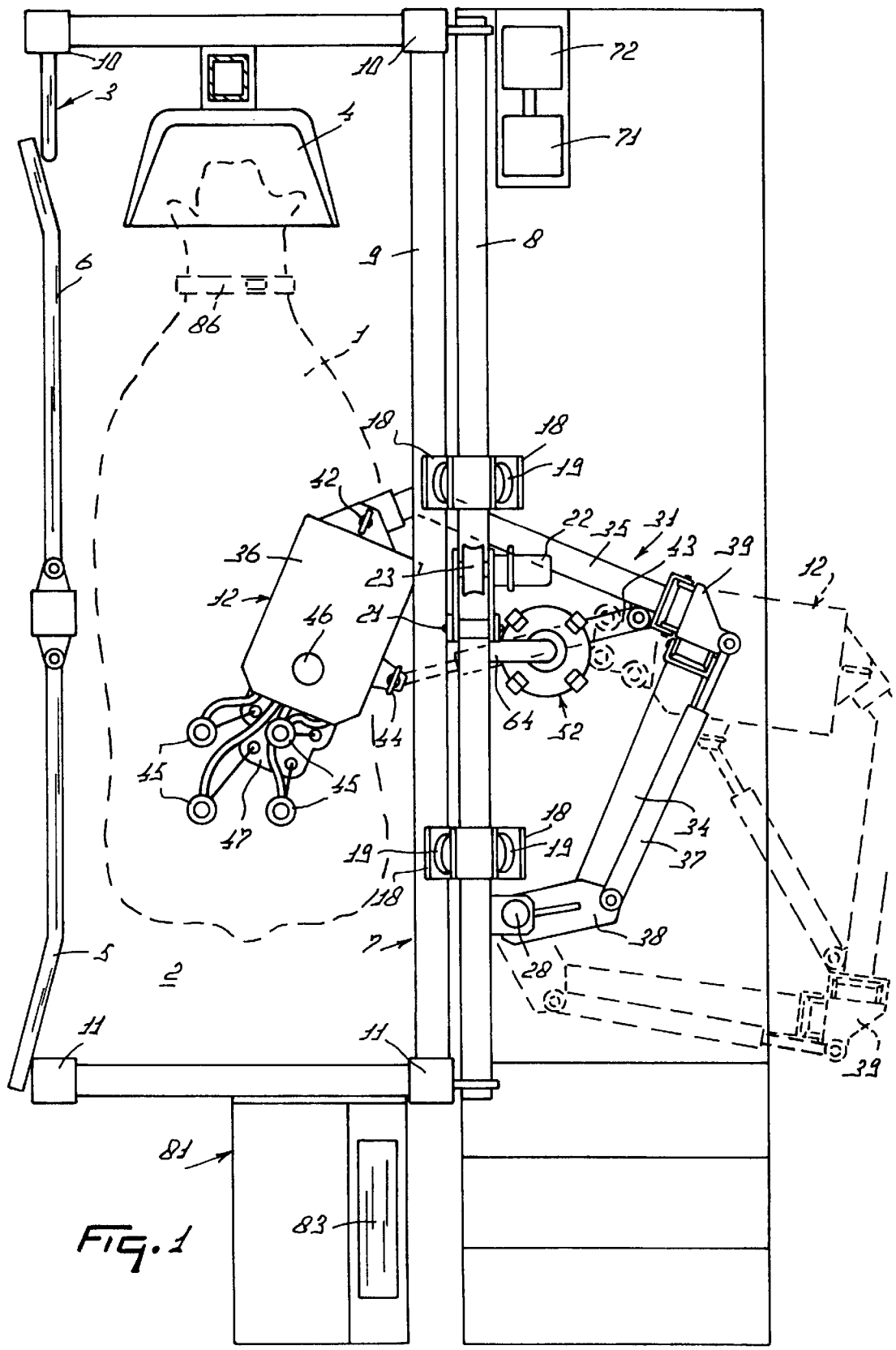
FIG. 1 is a plan view of a first embodiment of the implement in accordance with the invention, in which the teat cups of the milking robot have been moved to under an animal present in the milking parlor.

In the plan view of the construction shown in FIG. 1, a cow 1 is shown which is standing in a milking parlor 2, which milking parlor 2 is surrounded by a railing 3, which gives the cow 1 a limited freedom of movement. The milking parlor 2 can be entered by the cow 1 from the side at the rear, while the cow 1 can leave the milking parlor from the same side at the front. The front side of the milking parlor 2 is equipped with a feeder implement 4, whereby the cow 1 will advance sufficiently forward and arrive in a position in which she can easily be milked. At the longitudinal side of the milking parlor 2 other than the one at which the entrance 5 and the exit 6 are located, a portion of a rigidly arranged frame 7 which forms part of the railing 3 (FIG. 3) is accommodated, wherein frame 7 comprises a first frame portion 8 and a second frame portion 9. The first frame portion 8 extends parallel to and is predominantly located above the second frame portion 9. The first frame portion 8 is then rigidly connected to the outer side of two vertical pillars 10 and 11 which form part of the railing 3, while the second frame portion 9 is in a fixed position between these two pillars 10 and 11. A milking robot 12, for automatically milking animals, is movably connected to the first frame portion 8. The milking robot 12 bears against the second frame portion 9, which in all other respects is located at such a height that the arms of the robot 12 can be moved underneath this frame portion to under the cow 1 present in the milking parlor 2. The milking robot 12 includes a carrier frame 13 for the additional parts of the milking robot 12. By designing the first frame portion 8 as a rail, the carrier frame 13, and consequently the entire milking robot 12, can easily be moved along this frame portion. The carrier frame 13 is comprised of a beam 14 which predominantly extends parallel to the first frame portion 8, a beam 15 which is rigidly connected thereto and extends perpendicularly in the vertical downward direction, and two struts 16. Pairs of supporting elements 17 are provided near the ends of the beam 14, (FIG. 3). Supporting plates 18 are attached at an angle of approximately 45° to each pair of supporting elements 17. Two rollers 19 are rigidly connected to the supporting plates 18, thereby forming a roller element pair. The carrier frame 13 is suspended from the first frame portion 8 and is easily movable thereon. Two carriers 20 are accommodated on both sides of the beam 14 of the carrier frame 13. A motor 22 is secured to these carriers 20, capable of pivoting about a pivot shaft 21. The motor 22 drives a roller 23 which preferably has a rubber surface, whereby the roller 23 is urged by means of a spring member 24 against the first frame portion 8. Since the spring member 24 acts between the motor 22 and the carrier frame 13, the roller 23, which is to be driven by the motor 22, is maintained in the position in which it presses against the first frame portion 8. Therefore, when the motor 22 is driven, it is moved along the first frame portion 8 in the longitudinal direction, taking the entire carrier frame 13 with it.

In the present embodiments, the beam 15 of the carrier frame 13 extends vertically downward to just below the second frame portion 9. A freely pivotal roller element 26 is provided at the bottom side of this beam 15. The second frame portion 9 is constructed of a rail, and more specifically by a rail in the form of a U-shaped beam. The freely pivotal roller element 26 being accommodated such that it is movable between the two upright edges of the U-shaped beam. Thus, the milking robot 12 bears against the second frame portion 9 and, when the milking robot 12 is moved over the first frame, portion 8 by the motor 22, the milking robot can easily move along the second frame portion 9. In addition to the carrier frame 13, the milking robot 12 includes a robot arm construction 31, (FIG. 2), which is movable by means of an operating cylinder 28 in a predominantly vertical direction relative to the carrier frame 13. The robot arm construction 31 is movably connected to the carrier frame 13 by means of a four-bar linkage 29. The four-bar linkage 29 includes two parallel and spaced-apart arms 30 of equal length. The robot arm construction 31 comprises a substantially vertical robot arm 32, as well as movable robot arms 34, 35 and 36 which are located in a substantially horizontal plane. The vertical robot arm 32 is connected with the beam 15 of the carrier frame 13 by the four-bar linkage 29. The operating cylinder 28 is operative between the carrier frame 13 and the vertical robot arm 32. In the present embodiments, the operating cylinder 28 is a servo-pneumatic positioning cylinder.

Figure 2:
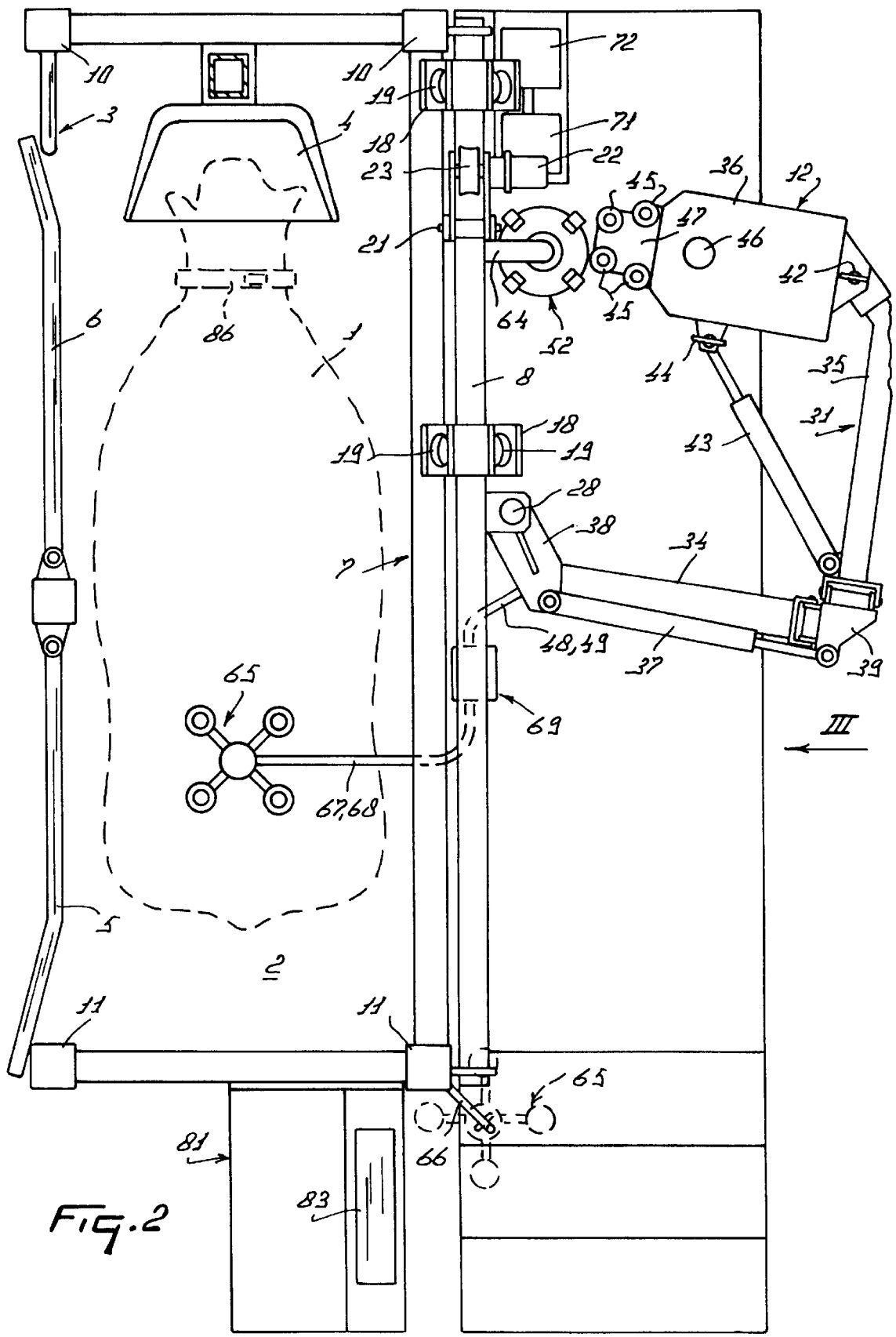
FIG. 2 is a plan view of a second embodiment of the implement in accordance with the invention, in which a second milking cluster has been moved to under an animal that is present in the milking parlor.

As is shown in FIG. 2, the milking robot 12 comprises robot arm 34, 35 and 36. The arms 34 and 35 are disposed at a fixed angle of 90° relative to each other. The arms 34 and 35 are therefore moved simultaneously. More specifically, the arms 34 and 35 are moved by an operating cylinder 37 which is positioned between a supporting plate 38 connected to the vertical robot arm 32 and a connecting member 39 provided between the two robot arms 34 and 35. The two robot arms 34 and 35 are pivotal about a predominantly vertical pivot shaft 40 which is located between the supporting plate 38 and a supporting plate 41. The supporting plate 41 is also rigidly connected to the bottom end of the vertical robot arm 32.

The robot arm 36 is pivotal relative to the robot arm 35 about a predominantly vertical pivot shaft 42 and is rotated relative to this shaft 42 by means of an operating cylinder 43 which is disposed between the robot arm 36 and that end of the robot arm 35 that is located near the connecting member 39. As illustrated in FIGS. 5 and 6, the vertical pivot shaft 42 is designed as a removable pin with a handle and a locking pin. The operating cylinder 43 is also connected to the robot arm 36 by a detachable pin 44 that is provided with a handle. By removing the pin 42 and the pin 44, the robot arm 36 can rapidly and simply be decoupled from the robot arm 35. This is particularly advantageous, when the arm 36 must be replaced, for example, if it is malfunctioning and cannot rapidly be repaired. The teat cups 45 which are connectable to the teats of the cow 1 are located near the end of the robot arm 36. The arm 36 is also provided with a sensor 46, which by performing a sector-by-sector scanning motion can accurately determine the position of the teats of the cow 1, whereby the operating cylinders 28, 37 and 43 can be controlled by a computer so that the teat cups 45 can be connected in the proper manner to the cow's teats. In the rest position the teat cups 45 shown in FIG. 6, are held against the carrier member 47 of the robot arm 36 by cylinders, (which are not illustrated). In an alternative embodiment, not illustrated, the teat cups 45 can be held against the carrier member 47 by means of electromagnets. Milk lines 48 and air lines 49 are connected to the teat cups 45. The milk lines 48 and the air lines 49, (illustrated in FIGS. 2 and 5), include sensors 50 for monitoring the milk flow and the air flow. In addition, mastitis sensors; (not illustrated), are incorporated in the milk lines 48, with the aid of which the milk production can be inspected. The bottom side of the carrier member 47 is provided with a sensor 51, which produces a signal when the carrier member 47 comes into contact with the floor of the milking parlor 2. To prevent the carrier member 47 from being contaminated or damaged on contact with the floor, the operating cylinder 28 is energized immediately after the sensor 51 has supplied the signal, so that the arm 36 is immediately retracted upwardly.

A cleaning device 52 for cleaning the teat cups 45 is positioned at the bottom side of the beam 15 of the carrier frame 13. In FIG. 4 this cleaning device 52 is shown in an enlarged scale. The cleaning device 52 comprises four spray caps 53 which are provided with perforations 54 at the bottom sides. The spray caps 53 are positioned apart from each other in a first lid-shaped housing 55. The first housing 55 is clamped on a second box-like housing 57 by means of four quick couplings 56. The quick coupling 56 includes a handle 58 which is connected to the second housing 57 by means of a horizontal pivot shaft 59. Attached to the handle 58 is a strip 60 which is made of resilient material and can rotate about a horizontal shaft 61 relative to the handle 58. The bottom side of the strip 60 is folded, for example, to form a hook. The folded piece can thereby cooperate with an edge 62 on the first housing 55. On the second housing 57 there are four stops 63, against which the upper side of the handle 58 bears when the first housing 55 and the second housing 57 are clamped against each other by means of the quick couplings 56. In addition, a line 64 is connected to the second housing 57, through which the rinsing or cleaning or both liquid for the teat cups can be passed. Cleaning the teat cups 45 is effected by connecting them to the spray caps 53 and by thereafter forcing rinsing liquid through the perforations 54. Should a blockage or a fault occur in the cleaning device 52, then the cleaning device 52 can rapidly be taken apart by means of the quick couplings 56. The separate parts of the cleaning device 52 are then easily accessible and replaceable, if desired.

In the embodiment shown in FIGS. 2 and 3, the implement includes, in addition to a first set of teat cups 45 for automatically milking animals, a further second set of teat cups 65. In the rest position, as illustrated in FIG. 3 by means of broken lines, the second milking cluster 65 is suspended from a hook 66 attached to the upright 11. The second milking cluster 65 includes a milk line 67 and an air line 68, which are connected to a valve block 69. The milk line 48 and the air line 49 of the first milking cluster 45 are also connected to the valve block 69. In addition, two air lines 70 are connected to the valve block 69, the other ends of which are connected to an air evacuation pump 71. Pump 71 is driven by a motor 72 and produces the required vacuum for milking. The valve block 69 is further provided with switching means, which allows a choice to be made between energization of the first set of teat cups 45 or the second set of teat cups 65. The switching means comprises, as shown in FIG. 3, a panel 73 on which there are a plurality of switches 74. The construction can be switched from automatic milking to manual milking by using the switches 74. When the switches 74 are engaged, the air flow and the milk flow in the milk lines 48 and the air lines 49 of the first set of teat cups 45 are interrupted, while the air lines 70 are then connected to the air line 68 of the second set of teat cups 65. The milk line 67 of the second set of teat cups 65 is coupled during the switching operation to a milk discharge line, (not illustrated). After the switching procedure has ended, the user can manually connect the second set of teat cups 65 to the cow, (see FIG. 3), and milking can start. For the purpose of manual milking, the robot arm construction 31 may be moved along the straight guide comprised by the first frame portion 8 towards the feeder implement 4. The robot arm construction 31 thereby hardly causes any obstruction during the manual connection of the second set of teat cups 65. The second set of teat cups 65 is particular usable then when the milking robot 12 is inoperable or is overhauled, because then the milking operations can be continued with the second set of teat cups 65.

In an alternative embodiment, (not shown), the second set of teat cups 65 is disposed on a supporting arm. The supporting arm can then be designed, for example, as an arm assembled from parts, wherein the parts are hingeable relative to each other.

The implement in accordance with the invention further includes an emergency device 75, which serves as an energy source when the implement cannot utilize the electricity from the main power supply. In the embodiments, the emergency device 75 is a battery 76. The battery 76 is connected to a battery charging station 77, whereby the battery 76 is charged and kept in condition. The battery charging station 77 is connected to the main power supply with an electric lead 78. The emergency device 75 is not limited to a battery, but may alternatively be in the form of a current generating set. The emergency device 75 further includes a push button 79 located near the upright 11 and with the aid of which the emergency device 75 can be achieved.

A first computer 81 is attached to the upright 11 by means of a first support 80. The first computer 81 includes a picture display screen 82 and a keyboard 83. Below the first computer 81, a second computer 85 is attached to the upright 11 by means of a second support 84. The second computer 84 also includes a picture display screen 82 and a keyboard 83. The second computer 85 is used for processing animal and management data, such as cow identification, mastitis detection, milk production check, and the like. The second computer 85 processes, for example, data received from the cow identification collar 86, from a mastitis detector, (not illustrated), and from a milk production checking sensor. In addition, signalling means are connected to the second computer 85 which can check whether a given exchangeable part is inoperable. For example, if it is indicated that the sensors 50 are inoperable, it is checked whether the air lines 49 and the milk lines 48 are free from leaks. Thus sensors may also be included in the operating cylinders 28, 37, 43 and the laser 46, to determine whether the relevant part functions adequately. If a certain part of the construction does not function or does not function adequately, then the relevant sensor applies a signal to the memory of the second computer 85, whereupon an error message for the relevant part appears on the picture display screen 82. The error message is accompanied by a number corresponding to a number provided on the relevant exchangeable part. When the faulty exchangeable part is repaired or replaced, the error message is cancelled and the milking operation can be resumed. The error message can in this situation also be passed on to a service department via a modem, not shown. The service department can communicate with the second computer 85, via the modem, and thus ask for further data and discuss with the local operator whether and how the disturbance can be eliminated as soon as possible. The second computer 85 is further provided with switching means, (not shown), whereby less vital parts or tasks of the milking robot 12 can be switched off either manually or automatically. For example, if a fault in the mastitis detector is found, then the second computer 85 automatically switches off the mastitis detection, so that the milk production can be continued in the normal way without the milk being checked for mastitis. The user is informed via the display screen 82 that the mastitis detector is inoperative. If the main power is interrupted, this causes the switching means of the second computer 85 to automatically trigger the emergency device 75.

The first computer 81 of the construction is designed as a process computer. The process computer 81 controls, inter alia, the operating cylinders 28,37 and 43 of the robot arm construction 31 and the cylinders which retain the first teat cups 45 on the carrier member 47. In addition, the process computer 81 controls, inter alia the valve block 69, the pump 71, the cleaning device 52 and the motor 22. The process computer 81 also processes the data received from the laser 46.

A number of processes can be made inoperative via the keyboard 83 of the first computer 81. This is particularly advantageous when, for example, one of the cylinders of the robot arm construction 31 is malfunctioning and a substitute cylinder is not rapidly available. The user can then switch over the milking robot 12 with the aid of the keyboard 83 to the manually operable milking implement. The user then, for example, de-energizes the laser 46, as well as the operating cylinders 37, 43 and the motor 22. Using the keyboard 83 of the first computer 81, the user can thereafter readjust operating cylinder 28 whereby the first teat cups become located below the level of the teats of the cow 1. Thereafter, as is shown in FIG. 1, the user can pivot the robot arm structure 31 from the position indicated by broken lines about the pivot shaft 40 to under the cow 1, (the position indicated by the solid lines). By temporarily switching off the cylinders which pull the first teat cups 45 up against the carrier member 47, it becomes possible to connect manually the first teat cups 45 to the teats of the cow 1, whereafter milking can be started. The automatic decoupling of the first teat cups 45 can, just as previously described for automatic milking, be effected automatically by energizing the cylinders of the first teat cups 45.

Both the first computer 81 and the second computer 85 are provided with printed circuits, (not illustrated). The printed circuits are inserted by means of a rapidly decouplable connection on a mother board. The printed circuits comprise signalling means which apply a signal to the memory of the relevant computer 81, 85, if the relevant printed circuits is malfunctioning. An error message indicating the relevant printed circuit then appears on the picture display screen of the computer 81, 85, whereupon the user can repair or replace the printed circuit.

Although I have described the preferred embodiments of my invention, it should be understood that it is capable of other adaptations and modifications within the scope of the appended claims.

I claim:

1. An apparatus for automatically milking animals, such as cows, comprising a milking compartment, a milking robot operable to milk an animal in said milking compartment, said milking robot including milking means which comprises a set of teat cups that are automatically connected to and disconnected from said animal's teats by said milking robot, an emergency power source on said compartment, said emergency power source serving to provide the apparatus with electrical power in the event that electricity from a power main is not available, switching means for automatically switching over to said emergency source from said power main to substitute electricity from said emergency power source in lieu of electricity from said power main for operating said milking robot in the event of said power main's failure, said emergency power source having a capacity to provide electrical energy to operate said milking robot continuously to milk animals received in said milking compartment for a period of at least about twenty-four hours.

2. An apparatus for automatically milking animals, such as cows, in combination with and installed in a milking parlor, the apparatus comprising:

teat cups and a robotic mechanism for automatically connecting and disconnecting said teat cups to and from the teats of the animal being milked, said robotic mechanism being powered by electricity from a power main;

said milking parlor including at least one emergency device, said emergency device comprising an electrical energy source of electricity which automatically substitutes electricity therefrom for electricity from said power main in the event of failure of the latter, said emergency device having a capacity to operate said robotic mechanism for automatically milking animals received in said milking parlor for at least about twenty-four hours.

3. An apparatus in accordance with claim 2, wherein said electrical energy source comprises at least one electrical battery.

4. An apparatus in accordance with claim 2, comprising a computer for controlling the apparatus including controlling said robotic mechanism, the apparatus comprising a plurality of components including components which are not vital to the milking operations, said computer including means for selectively rendering said components which are not vital to the milking operation inoperative.

5. An apparatus in accordance with claim 2, wherein said emergency device comprising at least one battery for providing an electrical power supply to the apparatus in the event that electricity from the power main fails, said energy device upon the occurrence of said failure automatically causing said battery to provide the electrical power to operate vital components of the apparatus and also causing components of the apparatus which are not vital to the milking operations to become inoperative.

6. An apparatus in accordance with claim 2 wherein said electrical energy source comprises an electrical current generating set.

7. An apparatus for automatically milking cows comprising a plurality of components including components which are vital to the milking operations and components which are not vital to the milking operations, an emergency energy source for operating said components, a computer controlling the operations of said components, said computer including switching means for switching the energy sources for said components from a non-emergency energy source to said emergency energy source, said computer including means selectively rendering said components not vital to the milking operation inoperative when it switches the power source for operating said components from said non-emergency energy source to said emergency energy source.

8. Apparatus in accordance with claim 7 wherein said components which are vital to the milking operations include a milking robot.

9. An apparatus in accordance with claim 7 wherein said components which are not vital to the milking operations comprise milk production inspection means.

10. An apparatus in accordance with claim 7 wherein said components which are not vital to the milking operations comprise teat disinfection apparatus.

11. An apparatus in accordance with claim 7 wherein said components which are not vital to the milking operations comprise a mastitis detector.

12. An apparatus in accordance with claim 7, wherein said components which are vital to the milking operations comprise a milking robot and said components which are not vital to the milking operations comprise milk production inspection means, milk disinfecting apparatus and a mastitis detector.

13. An apparatus in accordance with claim 7 wherein said emergency energy source comprises a battery and said non-emergency energy source comprises an electrical main, the apparatus further comprising a battery charging station by means of which said battery is maintained in a charged condition by said non-emergency energy source.

14. An apparatus in accordance with claim 7 wherein said emergency energy source comprises an electrical generator.

15. An apparatus for automatically milking animals, such as cows, in combination with and installed in a milking parlor, the apparatus comprising:

teat cups and a robotic mechanism for automatically connecting and disconnecting said teat cups to and from the teats of the animal being milked, said robotic mechanism being powered by electricity from a power main;

a computer for controlling the apparatus, including controlling said robotic mechanism, said apparatus comprising a plurality of components including components which are not vital to the milking operations, said computer including means for selectively rendering said components which are not vital to the milking operation inoperative;

said milking parlor including at least one emergency device, said emergency device comprising an electrical energy source of electricity which substitutes electricity therefrom for electricity from said power main in the event of failure of the latter.

16. An apparatus for automatically milking animals, such as cows, in combination with and installed in a milking parlor, the apparatus comprising:

teat cups and a robotic mechanism for automatically connecting and disconnecting said teat cups to and from the teats of the animal being milked, said robotic mechanism being powered by electricity from a power main;

said milking parlor including at least one emergency device comprising at least one battery for providing an electrical power supply to the apparatus in the event that electricity from the power main fails, said emergency device upon the occurence of said failure automatically causing said battery to provide electrical power to operate vital components of the apparatus and also causing components of the apparatus which are not vital to the milking apparatus to become inoperative.

* * * * *